M. J. Robinson,
Revolving Rake.

No. 107,411. Patented Sep. 13, 1870.

Witnesses:
A. Ruppert
Geo. A. Mark

Inventor:
M. J. Robinson
per Edson Bros.
Attorney

United States Patent Office.

MACEDON J. ROBINSON, OF ASHLEY, ILLINOIS.

Letters Patent No. 107,411, dated September 13, 1870.

IMPROVEMENT IN HORSE HAY-RAKES.

The Schedule referred to in these Letters Patent and making part of the same.

*To all whom it may concern:*

Be it known that I, MACEDON J. ROBINSON, of Ashley, in the county of Washington and State of Illinois, have invented a new and improved Hay-Rake; and I do hereby declare that the following is a full, clear, and exact description thereof, reference being had to the accompanying drawing.

Drawing.

Similar letters of reference designate identical parts in each of the figures.

Figure 1:
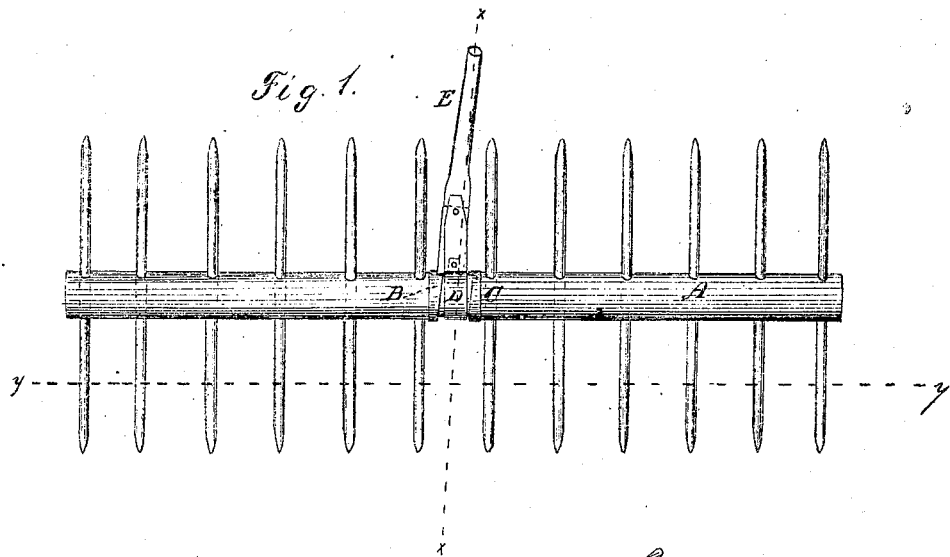
Figure 1 is a top plan view of my rake.
Figure 2:
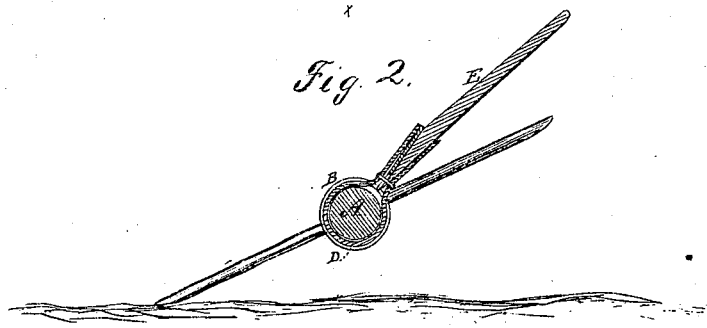
Figure 2 is a vertical transverse section, taken on line $x$ $x$ of fig. 1.
Figure 3:
Figure 3 is a longitudinal section, taken on the line $y$ $y$ of fig. 1.

The object of this invention is to produce a rake that shall be controlled in its revolutions by the attendant simply holding the handle a little to the right or left, thus securing or releasing the same; and to this end, My invention consists in the construction and combination of the parts composing the same, as will be hereinafter more fully set forth in the description and claim which follows.

To enable others informed in the art to which my invention relates to make and use the same, I will proceed to describe its construction and operation.

In the annexed drawing, forming a part of this specification—

A is the shaft, through which the teeth of the rake are secured.

Upon this shaft, at or about its center, are secured two annular rings, B C.

The ring B has two shoulders, one upon each side, which shoulders are made by forming two inclined planes upon its inner surface.

The other ring, C, has two notches arranged opposite to the shoulders of the other ring B, the ring being beveled a little upon one side of the notches.

D is a band, which encircles the shaft A, and is secured to the handle E in such a manner as to form a pivotal point, so that the inner end of the handle can be moved either to the right or left.

E is the handle, which is secured to the band D, as described, and is provided with a metal plate of such thickness as to allow it to enter the notches in the ring C.

The operation may be stated as follows:

Press the plate against the ring B, until it strikes one of its shoulders. Then throw the plate into the notch in ring C adjoining, when the rake will be secured, and you can raise up or bear down upon the handle.

When it is desired to have the rake revolve, throw the plate out of the notch in ring C and against ring B, until it performs a half revolution and strikes one of the shoulders upon said ring, when it can be thrown into the adjoining notch, and again secured, and so on.

Having thus described my invention,

What I claim, and desire to secure by Letters Patent of the United States, is—

The combination of the handle E, band D, rings C B, and shaft A, the several parts being constructed, arranged, and operated as shown and described.

In testimony whereof I have signed my name to this specification this 2d day of August, A. D. 1870.

MACEDON J. ROBINSON.

Witnesses:
S. E. GATTERLIN,
E. T. RIDGWAY.